United States Patent
Linke et al.

(10) Patent No.: US 7,887,742 B2
(45) Date of Patent: Feb. 15, 2011

(54) PROCESS AND APPARATUS FOR THE BLOW MOLDING OF CONTAINERS USING WALL-THICKNESS MEASUREMENT OF THE MOLDED ARTICLE

(75) Inventors: Michael Linke, Ahrensburg (DE); Michael Litzenberg, Geesthacht (DE); Rolf Baumgarte, Ahrenburg (DE); Frank Lewin, Tangstedt (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 0 days.

(21) Appl. No.: 12/225,607

(22) PCT Filed: Feb. 22, 2007

(86) PCT No.: PCT/DE2007/000331

§ 371 (c)(1),
(2), (4) Date: Aug. 31, 2009

(87) PCT Pub. No.: WO2007/110018

PCT Pub. Date: Oct. 4, 2007

(65) Prior Publication Data

US 2010/0007060 A1    Jan. 14, 2010

(30) Foreign Application Priority Data

Mar. 29, 2006   (DE) ................ 10 2006 014 389

(51) Int. Cl.
*B29C 49/78*   (2006.01)
(52) U.S. Cl. .............. 264/519; 264/521; 264/535; 264/40.1; 425/141; 425/526

(58) Field of Classification Search ............... None
See application file for complete search history.

(56) References Cited

U.S. PATENT DOCUMENTS 6,620,352 B1 *   9/2003   Davis et al. ................ 264/40.4

FOREIGN PATENT DOCUMENTS

| AT | 000 521 | 12/1995 |
| DE | 23 52 926 | 4/1975 |
| DE | 42 12 583 | 10/1993 |
| DE | 43 40 291 | 6/1995 |
| DE | 198 43 053 | 3/2000 |
| DE | 199 06 438 | 8/2000 |
| WO | 2005/000558 | 1/2005 |

* cited by examiner

*Primary Examiner*—Monica A Huson
(74) *Attorney, Agent, or Firm*—Lucas & Mercanti, LLP; Klaus P. Stoffel

(57) ABSTRACT

The process and the apparatus serve for the blow moulding of containers (2). A parison (1) composed of a thermoplastic material is first subjected to heat conditioning along a transport path in the region of a heating section (30). The parison is then subjected to a forming process within a blow mould with exposure to blowing pressure to give heat container. The heat conditioning of the parisons is carried out by a plurality of mutually superposed radiant heaters (41). The blow moulding of the container is followed by wall-thickness measurement at at least one level within the height of the container. The heating power of a radiant heater associated with this height level is controlled. The control system receives a prescribed wall-thickness value as required value and the measured wall thickness as actual value.

26 Claims, 6 Drawing Sheets

PROCESS AND APPARATUS FOR THE BLOW MOLDING OF CONTAINERS USING WALL-THICKNESS MEASUREMENT OF THE MOLDED ARTICLE

The invention concerns a process for blow molding containers, in which a preform made of a thermoplastic material is subjected to thermal conditioning along a conveyance path in a heating line and then molded into a container in a blow mold by the action of blowing pressure, and in which the thermal conditioning is carried out by several radiant heaters arranged one above the other.

The invention also concerns an apparatus for blow molding containers made of a thermoplastic material. This apparatus comprises at least a heating line arranged along a conveyance path and a blowing station equipped with a blow mold. The heating line has at least one heating element with at least two radiant heaters arranged one above the other.

In container molding by the action of blowing pressure, preforms made of a thermoplastic material, for example, preforms made of PET (polyethylene terephthalate), are fed to different processing stations within a blow-molding machine. A blow-molding machine of this type typically has a heating system and a blowing system, in which the preform, which has first been brought to a desired temperature, is expanded into a container by biaxial orientation. The expansion is effected by means of compressed air, which is introduced into the preform to be expanded. DE-OS 43 40 291 explains the process-engineering sequence in this type of preform expansion. The aforementioned introduction of compressed gas also comprises the introduction of compressed gas into the developing container bubble and the introduction of compressed gas into the preform at the beginning of the blowing operation.

The basic design of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding apparatus. The use of transport mandrels, onto which the preforms are slipped, has proven especially effective. However, the preforms can also be handled with other supporting devices. Other available designs involve the use of grippers for handling the preforms and the use of expanding mandrels, which can be inserted in the mouth region of the preform to support the preform.

The handling of containers with the use of transfer wheels is described, for example, in DE-OS 199 06 438, with the transfer wheel arranged between a blowing wheel and a delivery line.

The above-explained handling of the preform occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

Before a heating operation is carried out, the preforms are typically slipped onto transport mandrels, which either convey the preforms through the entire blow-molding machine or merely revolve within the heating system. In the case of vertical heating of the preforms in such a way that the mouths of the preforms are oriented vertically downward, the preforms are usually placed on a sleeve-like mounting element of the transport mandrel. In the case of suspended heating of the preforms, in which the mouths of the preforms are oriented vertically upward, expanding mandrels are usually inserted into the mouths of the preforms to clamp them tightly.

In carrying out container molding by blow molding, an essential task is to achieve a predetermined material distribution in the container wall. An important parameter for predetermining the material distribution that is obtained is the distribution of heat realized in the preforms before the blow molding.

The heat distribution is typically realized in such a way that an even temperature level is produced in a circumferential direction of the preforms, while a temperature profile is produced in a longitudinal direction of the preforms. In addition, a suitable temperature profile through the wall of the preform from the outside to the inside is also predetermined. It can basically be assumed that regions of the preform with a lower temperature lead to thicker wall regions of the blow-molded container, while the warmer regions of the preform are stretched to a greater extent during the blow molding operation and thus lead to thinner wall regions of the blow-molded container.

The temperature of the preforms can be measured with pyrometers. Exact wall thicknesses of the blow-molded containers can be measured with wall thickness sensors, which operate, for example, optically or with the use of sound waves.

The heating elements and individual radiant heaters used for heating the preforms are precisely adjusted mainly by manual means on the basis of an evaluation of the wall thickness distribution of the blow-molded containers. Due to the large number of heating elements arranged one after another in the direction of conveyance of the preforms and due to thermal equalization processes that take place, the adjustment is made adaptively and manually in an extensive test operation, in which settings are changed on an empirical basis, and the effects on the blow-molded containers are determined. A procedure of this type is generally very time-consuming. Moreover, when there are significant fluctuations of the ambient temperature or relative humidity, readjustments are necessary.

The objective of the present invention is to improve a process of the aforementioned type in a way that is conducive to high-quality heating and, at the same time, high production rates, while avoiding complexity from the mechanical-engineering standpoint.

In accordance with the invention, this objective is achieved by measuring a wall thickness at at least one height level of the container after the container has been blow molded, automatically controlling the heating capacity of a radiant heater associated with this height level, and by supplying the automatic control system a preassigned value for the wall thickness as the set point and the measured wall thickness as the actual value.

A further objective of the invention is to design an apparatus of the aforementioned type in a way that is conducive to high production rates with a simple constructive design and good product quality.

In accordance with the invention, this objective is achieved by connecting the radiant heaters to an automatic control system, which is connected with at least one sensor for detecting a wall thickness of the container, and by arranging the sensor at a height level that corresponds to a height level of the radiant heater, with the incorporation of a stretch factor, which is formed by the ratio of the length of the stretched region of the container to the length of the corresponding region of the preform.

The assignment of the wall thickness sensor to a height level of the container that is directly associated with a height level of a corresponding radiant heater makes it possible in the context of automatic control to adjust the heat emission of the radiant heater in such a way that the intended wall thickness of the container is exactly obtained. The automatic control system allows extensive automatic operation without the necessity of manual adjustments of the heating parameters. In particular, disturbances arising from variation of the environmental parameters are automatically controlled. Moreover, the automatic control system does not act on parameters that only indirectly influence the wall thicknesses that are being obtained, but rather the essential output parameter is taken into consideration directly as the actual value for the automatic control.

A high degree of contour precision of the blow-molded containers can be realized if the wall thickness measurement of the container is carried out at several different height levels.

Systematic control of the wall thickness conditions at different height levels can be realized if at least two pairs of measuring devices for the wall thickness of the container and automatic wall thickness controllers, which are arranged at mutually corresponding height levels, are integrated in their own closed-loop control system for carrying out a level-specific automatic wall thickness control operation.

A further improvement of the quality of the blow-molded containers can be realized by carrying out a temperature measurement of the preforms.

To provide a simple automatic control structure, it is proposed that automatic temperature control and automatic wall thickness control be carried out in a cascade control system.

It is conducive to automatic control of the wall thickness distribution if the automatic temperature control is carried out in an inner closed-loop control system of the cascade control system, and the automatic wall thickness control is carried out in an outer closed-loop control system of the cascade control system.

Thermal control of the preforms by all of the heating elements that are used can be taken into consideration if a temperature measurement of the preforms is carried out downstream of the heating line.

To take into account thermal equalization processes in the material of the preforms, it is proposed that the temperature measurement of the preforms be carried out between the heating line and a blowing wheel in the direction of conveyance of the preforms.

A simple design of the apparatus can be obtained if a wall thickness measurement is carried out downstream of the blowing wheel in the direction of conveyance of the preforms.

It is conducive to rapid performance of automatic control operations if only some of the heating elements of the heating line are controlled by the wall thickness controller.

Time delays in carrying out the automatic control can be minimized if at least the last heating element in the direction of conveyance of the preforms is controlled by the wall thickness controller.

A simplified design can be obtained if at least two heating elements are simultaneously controlled by the wall thickness controller.

It is also conducive to a simplified design if at least the first heating element in the direction of conveyance of the preforms produces a base temperature of the preform without any control.

Specific embodiments of the invention are schematically illustrated in the drawings.

Figure 1:
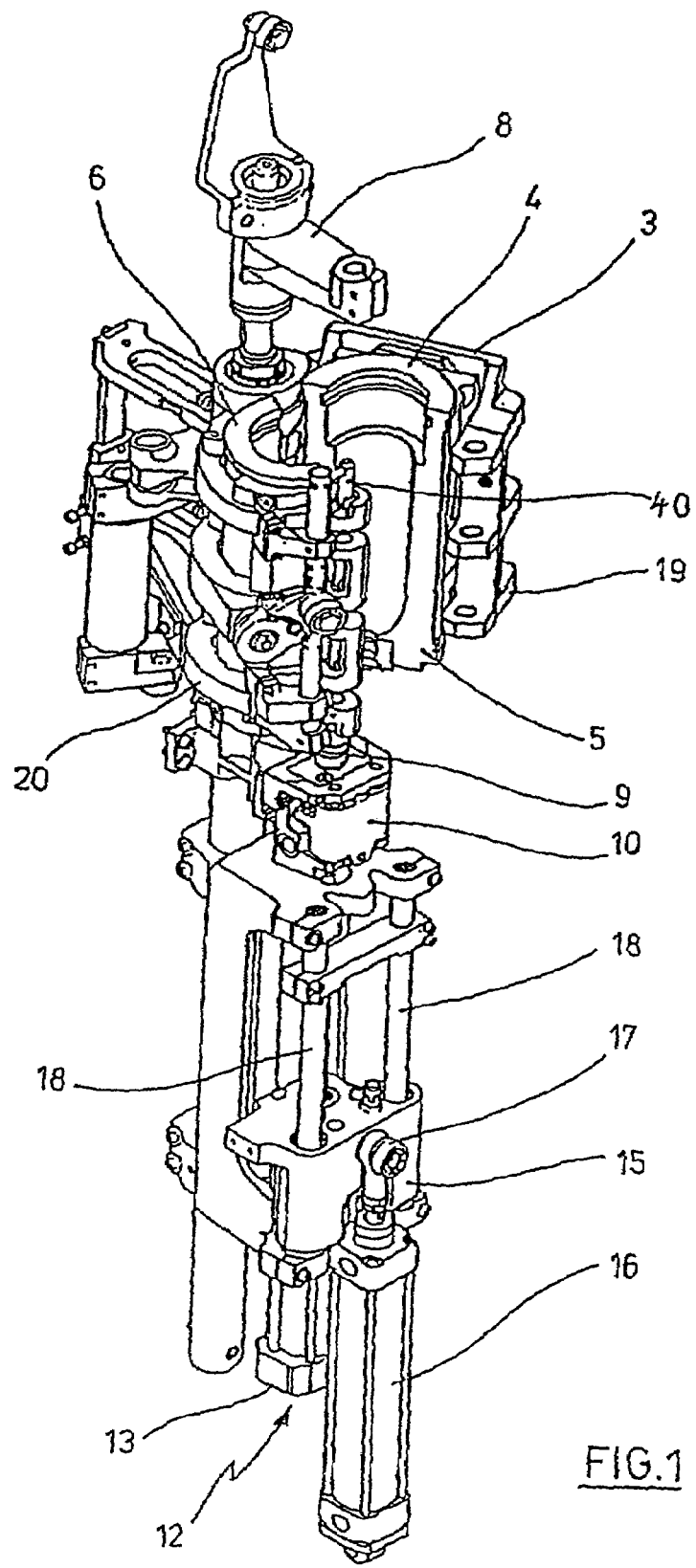
FIG. 1 shows a perspective view of a blowing station for producing containers from preforms.
Figure 2:
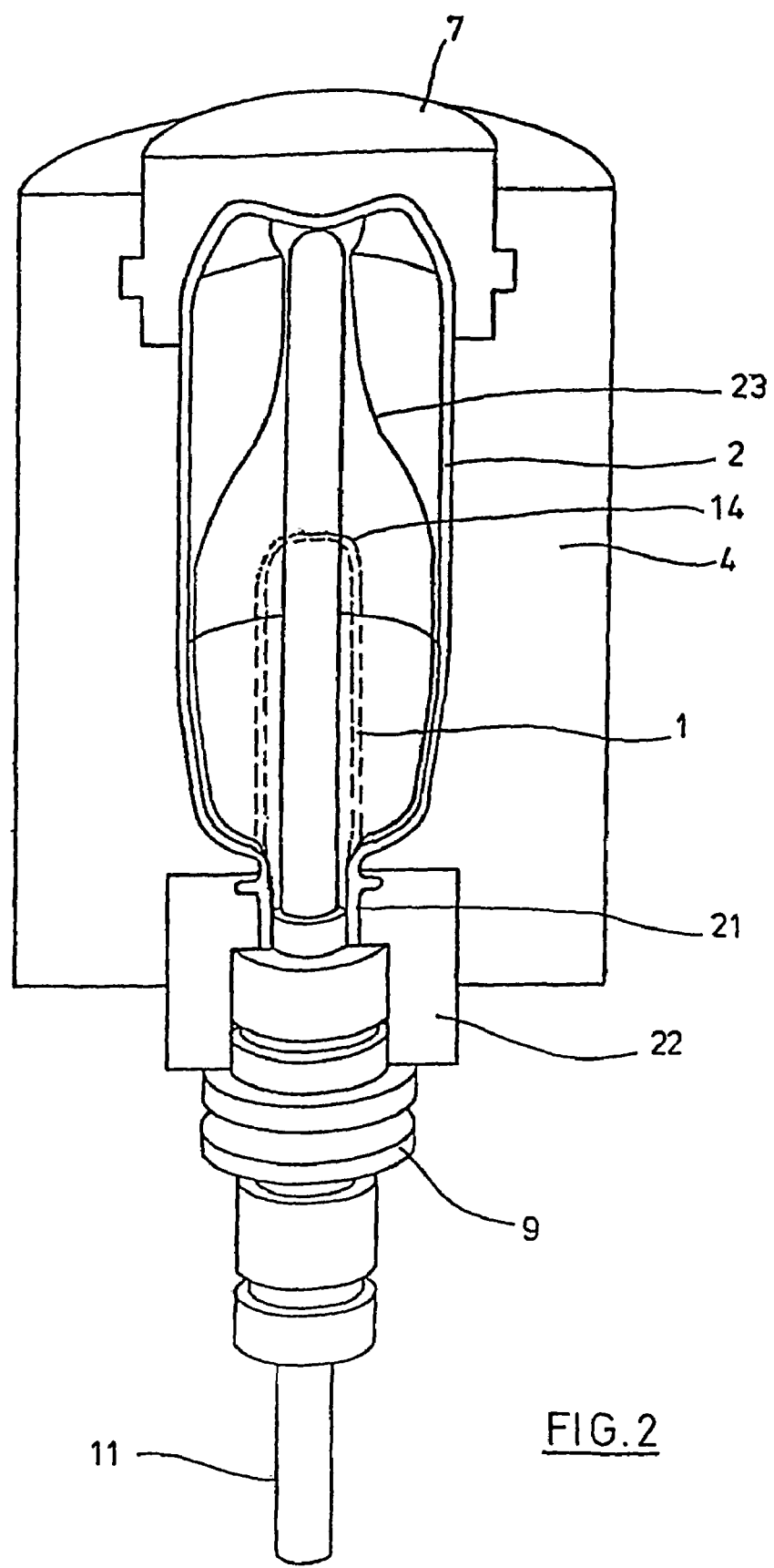
FIG. 2 shows a longitudinal section through a blow mold, in which a preform is stretched and expanded.

FIGS. 1 and 2 show the basic design of an apparatus for molding preforms 1 into containers 2.

The apparatus for molding the container 2 consists essentially of a blowing station 3, which is provided with a blow mold 4, into which a preform 1 can be inserted. The preform 1 can be an injection-molded part made of polyethylene terephthalate. To allow the preform 1 to be inserted into the blow mold 4 and to allow the finished container 2 to be removed, the blow mold 4 consists of mold halves 5, 6 and a base part 7, which can be positioned by a lifting apparatus 8. The preform 1 can be held in place in the area of the blowing station 3 by a transport mandrel 9, which, together with the preform 1, passes through a large number of treatment stations within the apparatus. However, it is also possible to insert the preform 1 directly into the blow mold 4, for example, with grippers or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by means of cam segments, which are acted upon by pickup rollers. The use of cam segments is advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13.

During the stretching operation itself, the primary cylinder 13 with the stretch rod extended, together with a carriage 15 that carries the primary cylinder 13, is positioned by a secondary cylinder 16 or by a cam control mechanism. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 20. To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
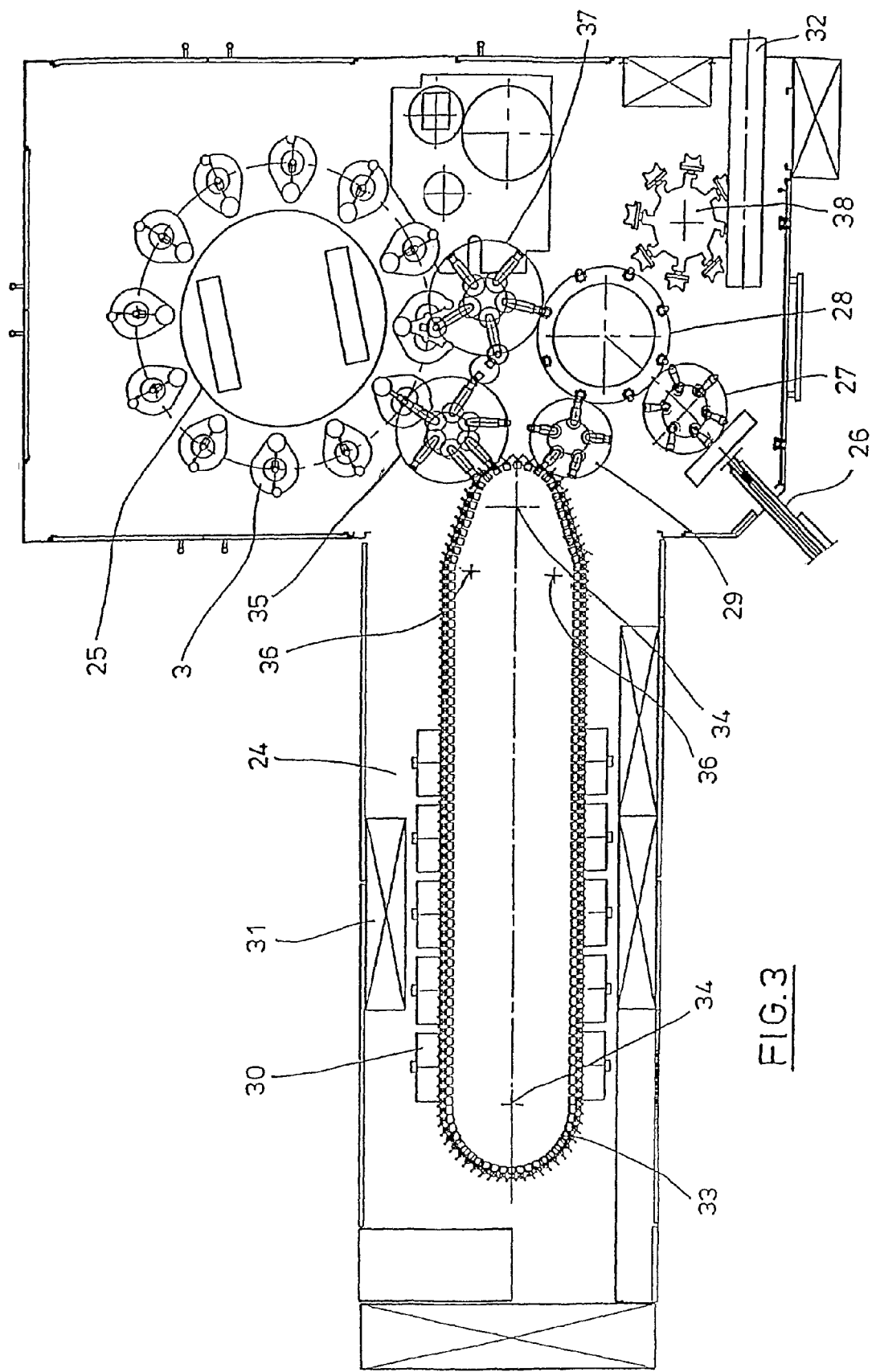
FIG. 3 is a drawing that illustrates a basic design of an apparatus for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Heating elements 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
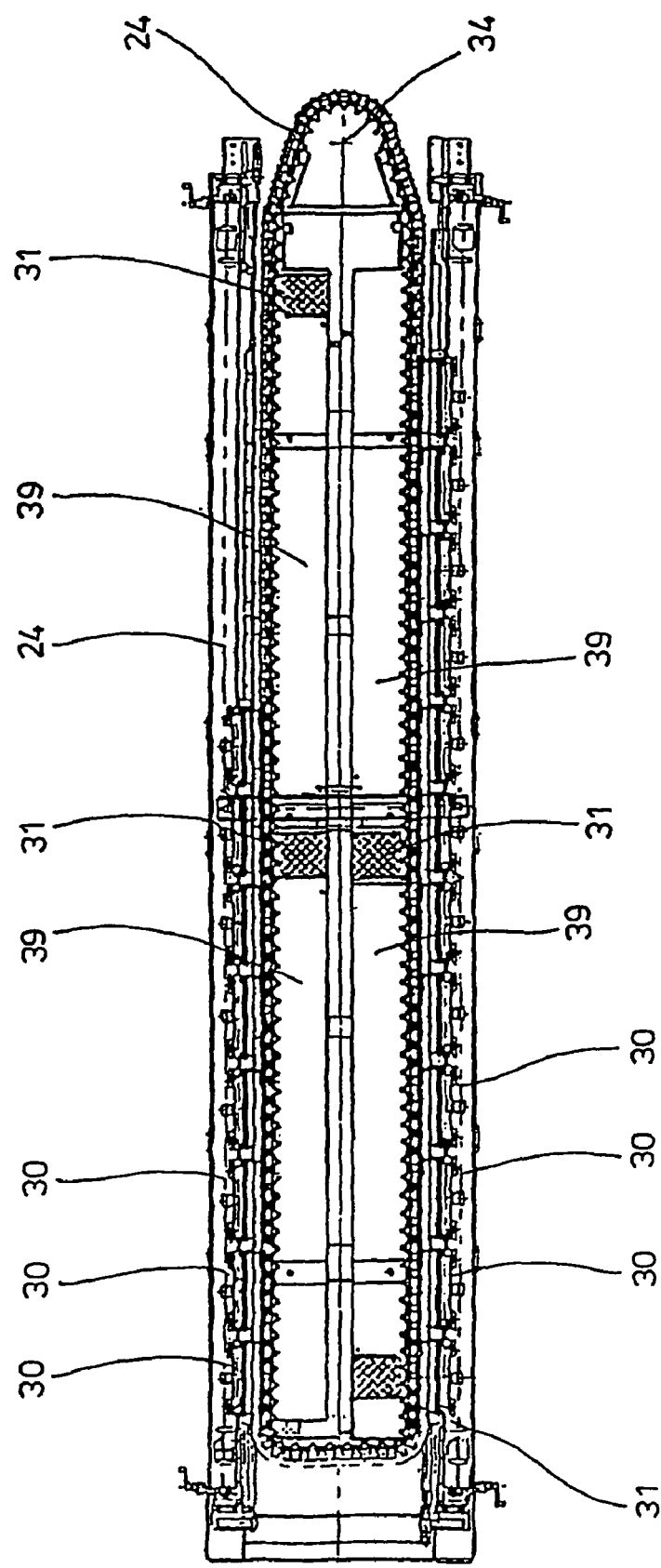
FIG. 4 shows a modified heating line with increased heating capacity.

In the modified heating line 24 illustrated in FIG. 4, a larger number of preforms 1 can be heated per unit time due to the larger number of heating elements 30. The fans 31 in this case feed cooling air into the area of cooling air ducts 39, which lie opposite the associated heating elements 30 and deliver the cooling air through discharge ports. A direction of flow of the cooling air essentially transverse to the direction of conveyance of the preforms 1 is realized by the arrangement of the discharge directions. In the area of surfaces opposite the heating elements 30, the cooling air ducts 39 can provide reflectors for the thermal radiation. It is also possible to realize cooling of the cooling elements 30 by the delivered cooling air.

Figure 5:
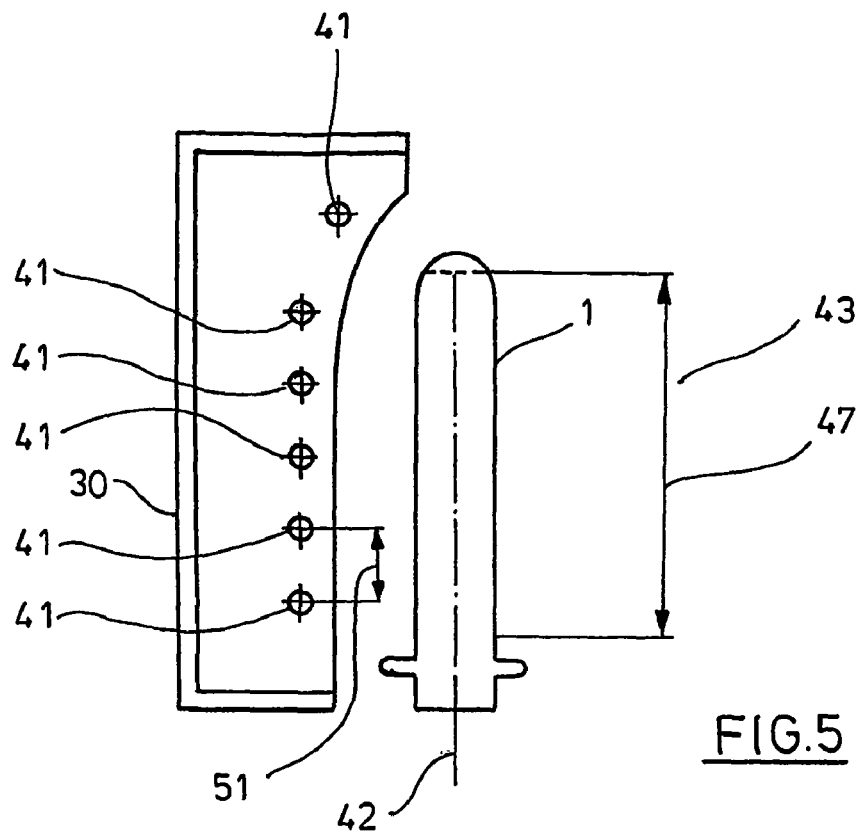
FIG. 5 shows a cross section through a heating element with a plurality of radiant heaters arranged one above the other and an associated preform.

FIG. 5 is a schematic drawing of a heating element 30 that is provided with a plurality of radiant heaters 41 arranged one above the other. With the use of the radiant heaters 41, it is possible to produce a predetermined temperature profile in the direction of a longitudinal axis 42 of the preform 1. When a stretching operation is being carried out, a stretch region 43 of the preform 1 is essentially subjected to a bilateral orientation.

Figure 6:
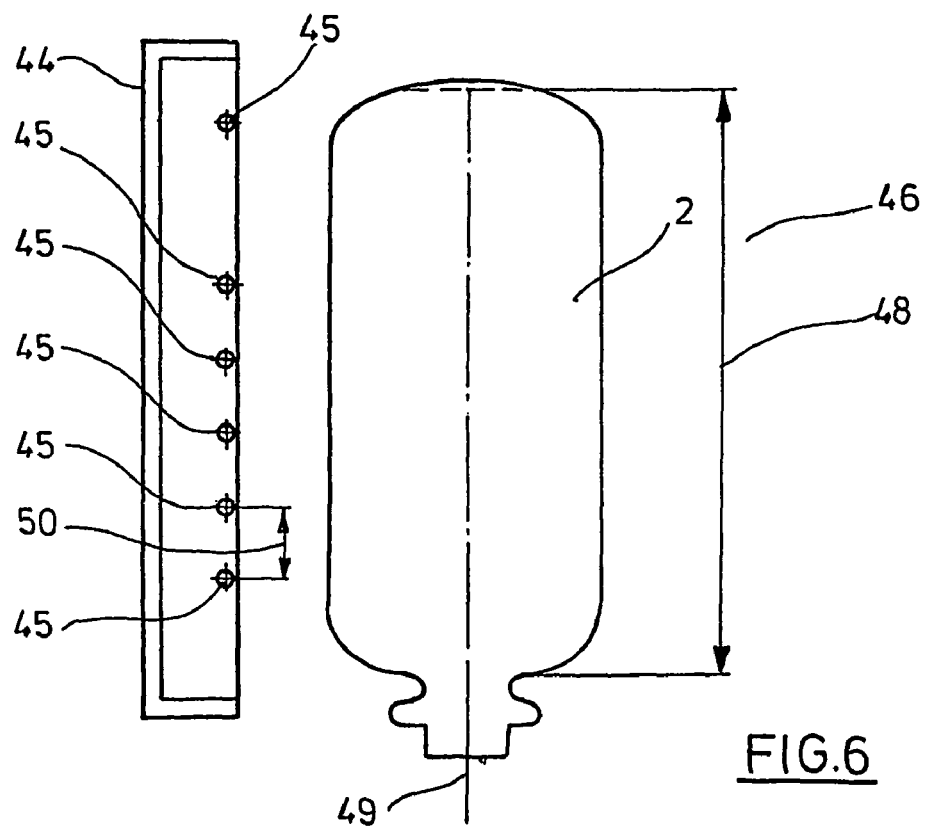
FIG. 6 shows a cross section through a sensor system for measuring wall thicknesses of a blow-molded container.

FIG. 6 is a schematic drawing of a measuring apparatus 44 with a plurality of sensors 45 arranged one above the other for detecting a wall thickness of the container 2. The stretch region 43 of the preform 1 is shaped into an orientation region 46 of the container 2 as a result of the stretching and blowing operation. The stretch region 43 of the preform 1 has an initial length 47, and the orientation region 46 of the container 2 has a product length 48. The quotient of the product length 48 and the initial length 47 represents the realized stretch factor.

The container 2 has a longitudinal axis 49, and the sensors 45 are arranged one after the other in the direction of this longitudinal axis 49. The distance 50 between the sensors is obtained as the distance 51 between the radiant heaters multiplied by the stretch factor.

Figure 7:
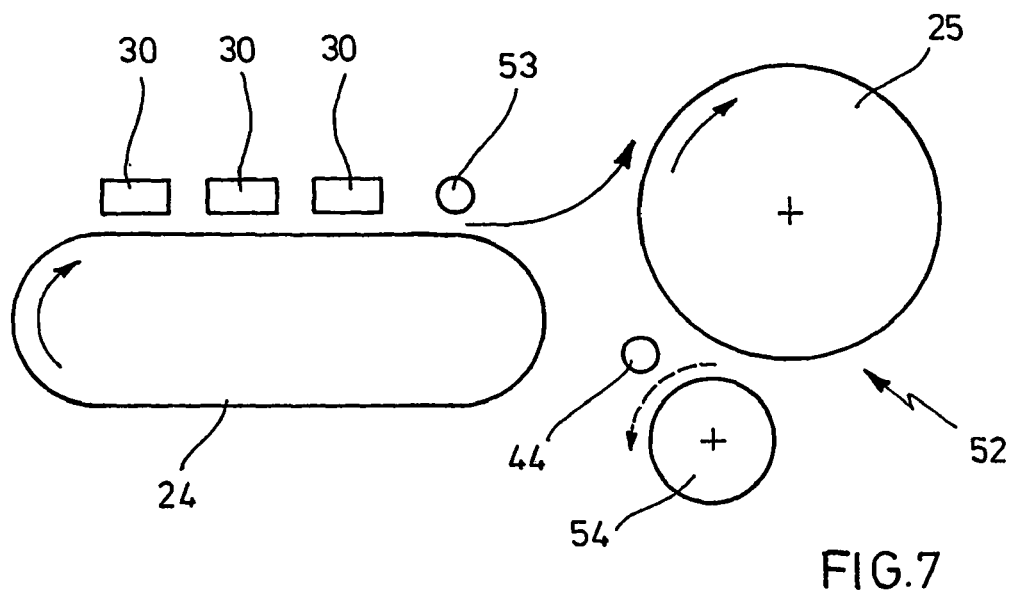
FIG. 7 shows a schematic drawing of a blow-molding machine with a heating line, blowing wheel, pyrometer, and wall thickness sensor.

FIG. 7 is a schematic drawing of a blow-molding machine 52 with a greatly simplified and highly schematic configuration compared to the drawing in FIG. 3. The drawing shows that a temperature sensor 53 for detecting a temperature of the preforms 1 is arranged near the heating line 24 downstream of the heating elements 30 in the direction of conveyance of the preforms 1. It is advantageous for the temperature sensor 53 to be arranged as closely as possible to the blowing wheel 25 to allow temperature detection after thermal equalization processes have taken place within the wall of the preforms 1. A pyrometer is an example of a temperature sensor 53 that can be used. In particular, it is possible to arrange several temperature sensors 53 one above the other in the direction of the longitudinal axis 42 of the preforms 1 in order to determine a temperature profile of the preforms 1. It has been found to be especially advantageous to position a plurality of temperature sensors 53 at the various height levels of the radiant heaters 41 in order to be able to carry out direct automatic control of the individual radiant heaters 41.

FIG. 7 also shows the arrangement of the measuring apparatus 44 for determining the wall thickness of the containers 2. For example, the measuring apparatus 44 can be arranged in the vicinity of an extraction apparatus 54, which carries the blow-molded containers 2 away from the area of the blowing wheel 25.

Figure 8:
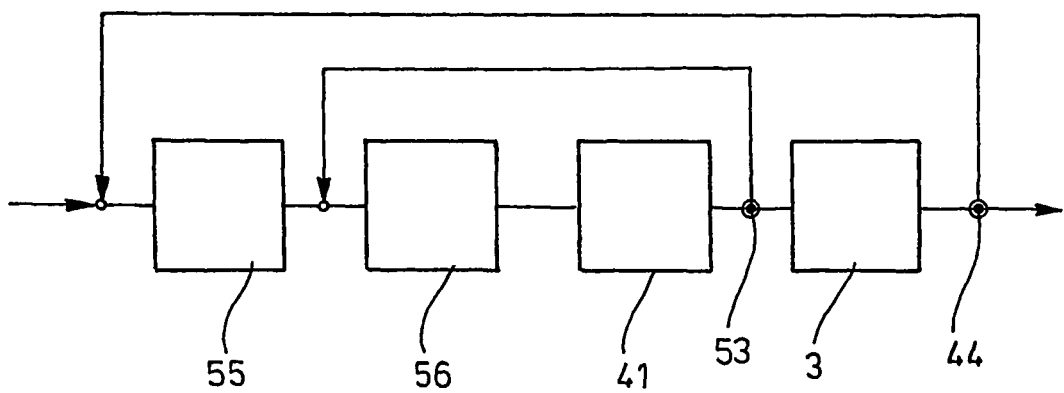
FIG. 8 shows a schematic drawing of an automatic control system design for automatically controlling the temperature of the preform and the wall thickness of the blow-molded containers.

FIG. 8 shows a schematic drawing of an automatic control system for the heating elements 30 and radiant heaters 41. The automatic control system is designed as a cascade control system. An outer closed-loop control system detects the wall thickness 2 of the container 2 at a predetermined height level by means of the measuring apparatus 44 downstream of the blowing station 3 and supplies this actual value to the input of a wall thickness controller 55. The direct input value for the wall thickness controller 55 is the control deviation between a preset wall thickness and the actual wall thickness determined by measurement. An output value of the wall thickness controller 55 provides the set point for an inner temperature closed-loop control system.

The difference between the output value of the wall thickness controller 55 and a temperature value of the preform 1 detected by the temperature sensor 53 at a predetermined height level is supplied to a temperature controller 56 as a direct reference value. An automatic control system of the type illustrated in FIG. 8 is typically assigned to each of the radiant heaters 41.

In a simplified automatic control system, the inner closed-loop control system is dispensed with, and automatic control is carried out solely with respect to the wall thickness without measurement and automatic control of the temperature. It is advantageous if at least one of the controllers 55, 56 is designed with integral control action in order to avoid control deviations. In accordance with another automatic control variant, the automatic control system takes into consideration lag time behavior of the automatic control system on the basis of the conveyance distances of the preforms 1 and containers 2. In this regard, it is taken into consideration that there is a known delay between a change in a correcting variable and a change in the output variable, which depends on the conveyance speed.

The invention claimed is:

1. A process for blow molding containers, in which a preform made of a thermoplastic material is subjected to thermal conditioning along a conveyance path in a heating line and then molded into a container in a blow mold by the action of blowing pressure, and in which the thermal conditioning is carried out by several radiant heaters arranged one above the other, wherein, after the container (2) has been blow-molded, a wall thickness is measured at at least one height level of the container (2), where the heating capacity of a radiant heater (41) only associated with this height level is automatically controlled, and where the automatic control system is supplied with a preassigned value for the wall thickness as the set point and the measured wall thickness as the actual value.

2. A process in accordance with claim 1, wherein the wall thickness measurement of the container (2) is carried out at several different height levels.

3. A process in accordance with claim 1, wherein at least two pairs of measuring devices (44) for the wall thickness of the container (2) and automatic wall thickness controllers (55), which are arranged at mutually corresponding height levels, are integrated in their own closed-loop control system for carrying out a level-specific automatic wall thickness control operation.

4. A process in accordance with claim 1, wherein a temperature measurement of the preforms (1) is carried out.

5. A process in accordance with claim 1, wherein automatic temperature control and automatic wall thickness control are carried out in a cascade control system.

6. A process in accordance with claim 1, wherein the automatic temperature control is carried out in an inner closed-loop control system of the cascade control system, and the automatic wall thickness control is carried out in an outer closed-loop control system of the cascade control system.

7. A process in accordance with claim 1, wherein a temperature measurement of the preforms (1) is carried out downstream of the heating line (24).

8. A process in accordance with claim 1, wherein the temperature measurement of the preforms (1) is carried out between the heating line (24) and a blowing wheel (25) in the direction of conveyance of the preforms (1).

9. A process in accordance with claim 1, wherein a wall thickness measurement is carried out downstream of the blowing wheel (25) in the direction of conveyance of the preforms (1).

10. A process in accordance with claim 1, wherein only some of the heating elements (30) of the heating line (24) are controlled by the wall thickness controller (55).

11. A process in accordance with claim 10, wherein at least the last heating element (30) in the direction of conveyance of the preforms (1) is controlled by the wall thickness controller (55).

12. A process in accordance with claim 1, wherein at least two heating elements (30) are simultaneously controlled by the wall thickness controller (55).

13. A process in accordance with claim 1, wherein at least the first heating element (30) in the direction of conveyance of the preforms (1) produces a base temperature of the preform (1) without any control.

14. An apparatus for blow molding containers made of a thermoplastic material, which comprises at least a heating line arranged along a conveyance path of a preform and a blowing station equipped with a blow mold, and in which the heating line has at least one heating element with at least two radiant heaters arranged one above the other, wherein the radiant heaters (41) are connected to an automatic control system, which is connected with at least one sensor (45) for detecting a wall thickness of the container (2), and that the sensor (42) is arranged at a height level that corresponds to a height level of the radiant heater (41), with the incorporation of a stretch factor, which is formed by the ratio of the length of the stretched region of the container (2) to the length of the corresponding region of the preform (1).

15. An apparatus in accordance with claim 14, wherein several sensors (45) are arranged at different height levels relative to one another.

16. An apparatus in accordance with claim 14, wherein pairs of sensors (45) and radiant heaters (41) assigned to different height levels are each arranged in a closed-loop control system assigned to the given height level.

17. An apparatus in accordance with claim 14, wherein the automatic control system has at least one temperature sensor (53).

18. An apparatus in accordance with claim 14, wherein at least one temperature sensor (53) and at least one sensor (45) for measuring the wall thickness are arranged together with an automatic wall thickness controller (55) and an automatic temperature controller (56) in a cascade control system.

19. An apparatus in accordance with claim 14, wherein the temperature sensor (53) and the temperature controller (56)

are arranged in an inner closed-loop control system of the cascade control system, and the sensor (45) for the automatic wall thickness control and the wall thickness controller (55) are parts of an outer closed-loop control system of the cascade control system.

20. An apparatus in accordance with claim 14, wherein the temperature sensor (53) is arranged downstream of the heating line (24) in the direction of conveyance of the preforms (1).

21. An apparatus in accordance with claim 14, wherein the temperature sensor (53) is arranged between the heating line (24) and a blowing wheel (25) in the direction of conveyance of the preforms (1).

22. An apparatus in accordance with claim 14, wherein the sensor (45) for measuring the wall thickness is arranged downstream of the blowing wheel (25) in the direction of conveyance of the preforms (1).

23. An apparatus in accordance with claim 14, wherein only some of the heating elements (30) of the heating line (24) are arranged in the closed-loop control system for controlling the wall thickness.

24. An apparatus in accordance with claim 14, wherein at least the last heating element (30) in the direction of conveyance of the preforms (1) is designed as part of the closed-loop control system for controlling the wall thickness.

25. An apparatus in accordance with claim 14, wherein at least two radiant heaters (41) arranged at the same height level in different heating elements (30) are simultaneously controlled by the closed-loop control system for controlling the wall thickness.

26. An apparatus in accordance with claim 14, wherein at least the first heating element (30) in the direction of conveyance of the preforms (1) is arranged outside of the closed-loop control system for controlling the wall thickness.

* * * * *